Oct. 2, 1928.
L. HANSEN
1,686,447
CHAIN FASTENING DEVICE
Filed Dec. 9, 1927
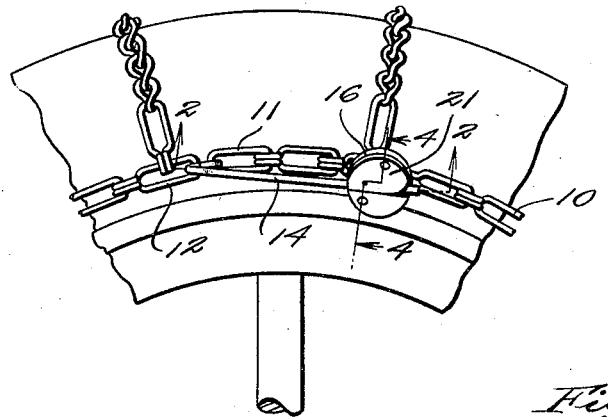
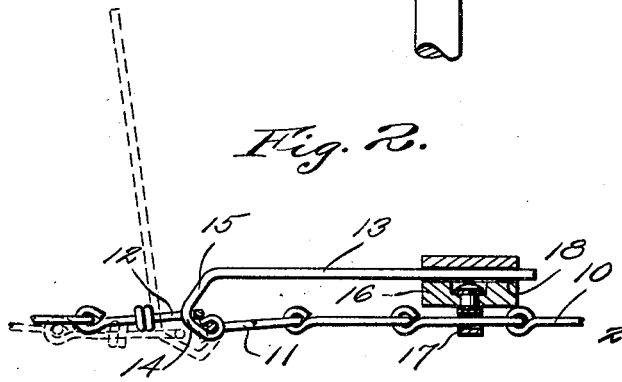
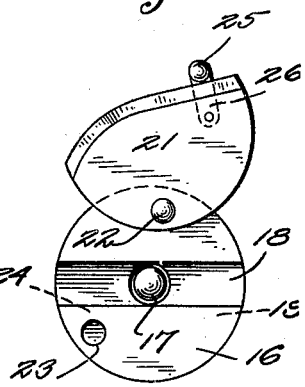
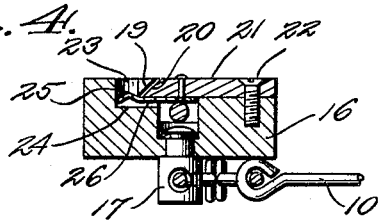
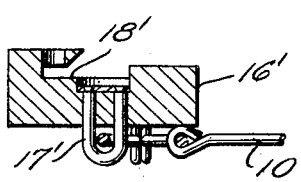
Louis Hansen
INVENTOR
BY Victor J. Evans
ATTORNEY
WITNESS:

Patented Oct. 2, 1928.

1,686,447

UNITED STATES PATENT OFFICE.

LOUIS HANSEN, OF CALGARY, ALBERTA, CANADA.

CHAIN-FASTENING DEVICE.

Application filed December 9, 1927. Serial No. 238,937.

This invention relates to fastening devices for use in joining the connecting end links of tire chains.

An object of the invention contemplates an operating lever carried upon one of the links and adapted to be passed and swung within the adjacent link to draw one toward the other.

Another object of the invention comprehends a locking element adapted to securely hold the free end of the operating lever against displacement when swung to occupy an active position.

With the above and other objects in view, the invention further consists of the following novel features and details of construction, to be hereinafter more fully described, illustrated in the accompanying drawing and pointed out in the appended claims.
In the drawing:

Figure 1 is a fragmentary side elevation of a tire chain applied and the invention in use.

Figure 2 is a sectional view taken on line 2—2 of Figure 1.

Figure 3 is a top plan view of the locking element.

Figure 4 is a sectional view taken on line 4—4 of Figure 1.
Figure 5 is a sectional view taken through a modified form of the invention.

Referring to the drawing in detail, wherein like characters of reference denote corresponding parts, the reference character 10 indicates a side chain having end links 11 and 12. An operating lever 13, carried by the link 11 and mounted for lateral swinging movement thereon, is successively offset at 14 and 15 to engage and guide the link 12 to occupy the position as illustrated in Figure 2 of the drawing when the operating lever 13 is swung upon the link 11.

A locking element, in the nature of a disk member 16 provided with a stud member 17 swiveled therein, is adapted for connection with the side chain 10. A recess or pocket 18 extended diametrically across the face of the disk 16 is adapted to accommodate the free end of the operating lever 13 therein. One side wall of the groove 18 is undercut as indicated at 19 and which is adapted to engage the beveled edge 20 of a closure plate 21 pivotally mounted, as indicated at 22, upon the disk member 16. An opening 23 having communication with the undercut wall 19 through the instrumentality of a slotted portion 24 is adapted to accommodate an upwardly struck projection 25 carried upon the outermost extremity of a spring locking finger 26 mounted upon the closure plate 21. The locking finger 26 being adapted to hold the closure plate 21 against displacement. In Figure 5 of the drawing, I have illustrated a modification of the invention which embodies a disk member 16' constructed after the manner of the disk 16 and which has substituted a yoke member 17' for the headed stud 17 of the disk member 16. A relatively wide recess or pocket portion 18' is also provided within the upper face of the disk member 16' to accommodate locking levers having relatively wide handle portions, the analogy of which is not shown. The identical locking means for the disk member 16 may also be effectively employed for use in conjunction with the modification.

Although I have shown and described my invention as being applied upon tire chains, it is obviously understood that the invention may be equally and effectually as well applied upon locking levers for other devices.

The invention is susceptible of various changes in its form, proportions and minor details of construction, and the right is herein reserved to make such changes as properly fall within the scope of the appended claims.

Having thus described the invention, what is claimed is:—

1. A chain fastening device comprising in combination a locking lever having connection with one end link and adapted to be passed through the other, of a locking element having a recess adapted to receive the free end of the lever, a closure plate carried by the locking element being adapted to hold the lever against displacement within the recess, and a locking finger carried by the closure plate being adapted for engagement with an appropriate portion of the locking element.

2. A chain fastening device comprising in combination an operating lever swingably mounted upon one connecting end link and adapted to be passed through and swung upon the other, of a disk member carried by the chain and having a recess adapted to receive the free end of the lever, one side wall of the recess being undercut, a closure plate swingably mounted upon the disk being provided with a beveled edge adapted to engage the undercut side wall, the disk having an opening communicating with the recess, and a spring finger carried by the closure plate being adapted for engagement with said opening to hold the closure plate against displacement.

3. A chain fastening device comprising in combination an operating lever swingably mounted upon one connecting end link and adapted to be passed through and swung upon the other, of a disk member carried by the chain and having the recess adapted to receive the free end of the lever, one side wall of the recess being undercut, a closure plate swingably mounted upon the disk being provided with a beveled edge adapted to engage the undercut side wall, the disk having an opening communicating with the recess, a spring finger carried by the closure plate being adapted for engagement with said opening to hold the closure plate against displacement, and means for anchoring the disk member upon the chain.

In testimony whereof I affix my signature.

LOUIS HANSEN.